US012409651B2

(12) United States Patent
Iwasaki et al.

(10) Patent No.: US 12,409,651 B2
(45) Date of Patent: Sep. 9, 2025

(54) LIQUID EJECTION MODULE

(71) Applicant: CANON KABUSHIKI KAISHA, Tokyo (JP)

(72) Inventors: Ayako Iwasaki, Kanagawa (JP); Yoshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 18/134,701

(22) Filed: Apr. 14, 2023

(65) Prior Publication Data

US 2023/0330989 A1 Oct. 19, 2023

(30) Foreign Application Priority Data

Apr. 18, 2022 (JP) ................................. 2022-068389

(51) Int. Cl.
*B41J 2/14* (2006.01)

(52) U.S. Cl.
CPC ...................... *B41J 2/14201* (2013.01); *B41J 2002/14419* (2013.01)

(58) Field of Classification Search
CPC .......... B41J 2/14201; B41J 2002/14419; B41J 2/14129; B41J 2002/14403; B41J 2002/14467; B41J 2202/12; B41J 2202/18; B41J 2202/20; B41J 2/14145; B41J 2/14072; B41J 2/1404
See application file for complete search history.

(56) References Cited

U.S. PATENT DOCUMENTS 10,300,707 B2 5/2019 Nakakubo et al.
11,345,162 B2 5/2022 Govyadinov et al.

FOREIGN PATENT DOCUMENTS

EP 3421239 A1 * 1/2019 ................ B41J 2/01
JP 2018-518386 A 7/2018
JP 2019-10762 A 1/2019

OTHER PUBLICATIONS

Nakakubo Toru et al., "Liquid Ejecting Module", Jan. 2, 2019, [Paragraphs 0016-0020, 0040-0041] (Year: 2019).*

* cited by examiner

*Primary Examiner* — Lisa Solomon
(74) *Attorney, Agent, or Firm* — Venable LLP

(57) ABSTRACT

To provide a liquid ejection module capable of arranging ejection openings for a high resolution and suppressing an increase in wiring resistance without decreasing liquid circulation efficiency, a liquid delivery mechanism is arranged below an energy generating element, a plurality of penetrating flow paths are provided to correspond to a plurality of pressure chambers, respectively, and electric wiring is routed between adjacent penetrating flow paths.

18 Claims, 6 Drawing Sheets

LIQUID EJECTION MODULE

BACKGROUND OF THE INVENTION

Field of the Invention

The present invention relates to a liquid ejection module which ejects liquid.

Description of the Related Art

Japanese Patent Laid-Open No. 2018-518386 discloses a configuration in which an energy generating element for liquid ejection, a liquid delivery mechanism for delivering liquid to be ejected, and a circulation flow path for fluidly connecting the liquid delivery mechanism to the energy generating element are arranged in the same layer.

Japanese Patent Laid-Open No. 2019-10762 discloses a configuration of a liquid ejection module comprising an energy generating element for liquid ejection and a liquid delivery mechanism for delivering liquid to be ejected, in which the liquid delivery mechanism is arranged on the rear face of the energy generating element.

In the configuration of Japanese Patent Laid-Open No. 2018-518386, however, the liquid delivery mechanism is arranged in an ejection opening array, which imposes a restriction on a resolution and makes it difficult to arrange ejection openings to correspond to a high resolution. In the case of increasing the resolution, the liquid delivery mechanism is downsized and the circulation efficiency is therefore decreased.

In the configuration of Japanese Patent Laid-Open No. 2019-10762, liquid is supplied to a plurality of pressure chambers from a common supply flow path and collected into a common flow path. Thus, wiring for supplying power to the energy generating element needs to detour around the supply flow path and the collection flow path. Since the wiring becomes long, there is a possibility of an increase in resistance.

SUMMARY OF THE INVENTION

Accordingly, the present invention provides a liquid ejection module capable of arranging ejection openings for a high resolution and suppressing an increase in wiring resistance without decreasing liquid circulation efficiency.

Therefore, a liquid ejection module of the present invention comprises: an ejection opening provided in a part of a pressure chamber; an energy generating element provided in a first substrate forming a part of the pressure chamber at a position facing the ejection opening and configured to provide liquid in the pressure chamber with energy; for ejection; a penetrating flow path which is a flow path penetrating the first substrate and is connected to the pressure chamber by a first opening; a liquid delivery flow path connected to a second opening different from the first opening of the penetrating flow path; a liquid delivery mechanism provided in the liquid delivery flow path and configured to provide liquid with energy for supplying liquid from the liquid delivery flow path to the pressure chamber through the penetrating flow path; and first electric wiring electrically connected to the energy generating element, wherein a plurality of the pressure chambers and a plurality of the energy generating elements are provided, the liquid delivery mechanism is provided in a second substrate stacked with the first substrate, a plurality of the penetrating flow paths are provided to correspond to the respective pressure chambers, and the first electric wiring is routed between the adjacent penetrating flow paths.

According to the present invention, a liquid ejection module capable of arranging, ejection openings for a high resolution and suppressing an increase in wiring resistance without decreasing liquid circulation efficiency can be provided.

Further features of the present invention will become apparent from the following description of exemplary embodiments with reference to the attached drawings.

DESCRIPTION OF THE EMBODIMENTS

First Embodiment

Figure 1:
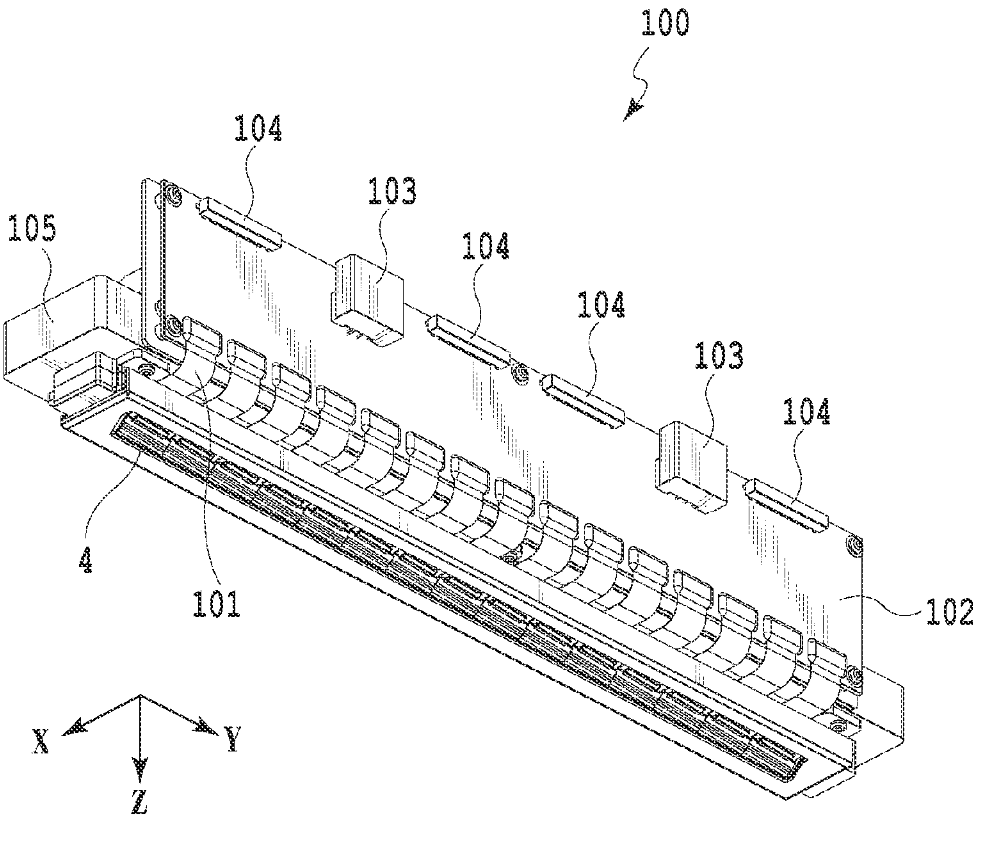
FIG. 1 is an external perspective view showing an inkjet print head.

The first embodiment of the present invention will be hereinafter described with reference to the drawings, FIG. 1 is an external perspective view showing an inkjet print head (hereinafter also simply referred to as a print head) 100 which can be used as a liquid ejection module of the present embodiment. The print head 100 is formed by a plurality of printing element substrates 4 arranged in a Y direction, each of the printing element substrates 4 being formed by a plurality of printing elements arranged in the Y direction. FIG. 1 shows the print head 100 of a full-line type formed by arranging the printing element substrates 4 in the Y direction over a distance corresponding to the width of an A4 size.

Each of the printing element substrates 4 is connected to an electric wiring board 102 via a flexible printed circuit board 101. The electric wiring board 102 is equipped with a power supply terminal 103 to receive power and a signal input terminal 104 to receive an ejection signal. In an ink supply unit 105, a circulation flow path is formed to supply each of the printing element substrates 4 with liquid (hereinafter also referred to as ink) supplied from an unshown ink tank and collect ink not consumed by printing.

Figure 2A:
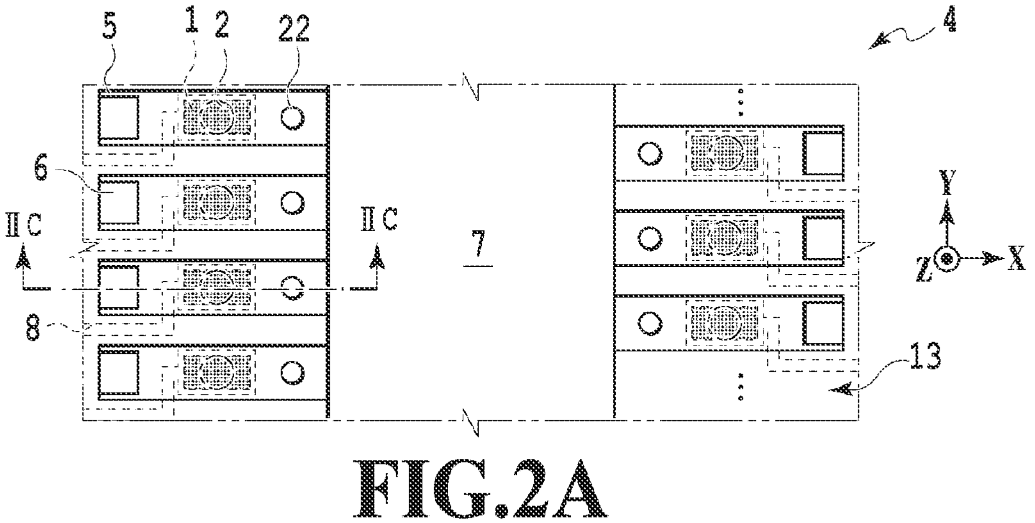
FIG. 2A is an enlarged view of part of a printing element substrate.
Figure 2B:
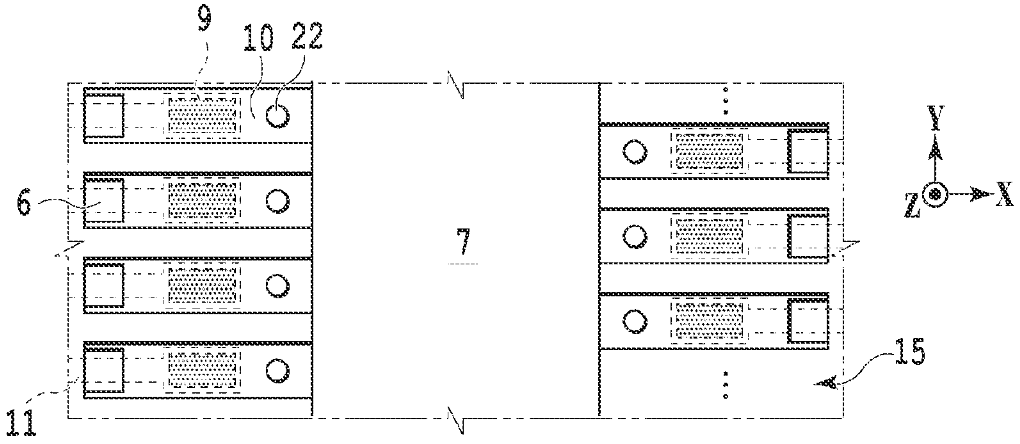
FIG. 2B is an enlarged view of part of the printing element substrate.
Figure 2C:
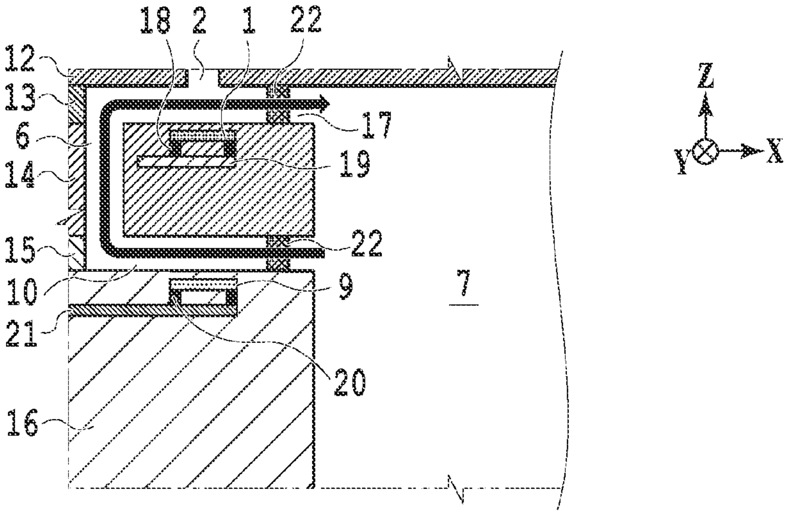
FIG. 2C is an enlarged view of part of the printing element substrate.

Each printing element provided on the printing element substrate 4 ejects ink supplied from the ink supply unit 105 in a Z direction in the drawing based on an ejection signal input from the signal input terminal 104 by the use of power supplied from the power supply terminal 103, FIG. 2A to FIG. 2C are enlarged views of part of the printing element substrate 4 and show a flow path configuration and wiring close to ejection openings in the present embodiment. FIG. 2A and FIG. 2B are plan views of the printing element substrate 4 seen from a side facing ejection openings 2 (+Z direction) and FIG. 2C is a cross-sectional view along IIC-IIC of FIG. 2A. Incidentally, FIG. 2A shows a configuration from an orifice plate 12 to a first substrate 14 and FIG. 2B shows a configuration from the first substrate 14 to a second substrate 16.

The printing element substrate 4 includes the second substrate 16, a second flow path member 15, the first substrate 14, a first flow path member 13, and the orifice plate 12, which are stacked in this order in the 7 direction. The surface of the first substrate 14 is provided with energy generating elements 1, which are electrothermal transducing elements. The ejection openings 2 are formed in the orifice plate 12 at positions corresponding to the energy generating elements 1. The ejection openings 2 also form an ejection opening array corresponding to the array of the energy generating elements 1. Between the orifice plate 12 and the first substrate 14, pressure chambers 3 are formed by the first flow path member 13 for the respective ejection openings 2 and the respective energy generating elements 1. The pressure chambers 3 are formed by providing partitions between the ejection openings 2 and the energy generating elements 1 arranged in the Y direction.

The energy generating element 1 provides energy for ejection to ink in the pressure chamber and the ink provided with the energy is ejected from the ejection openings 2. Incidentally, although the present embodiment describes the case of using an electrothermal transducing element as the energy generating element 1, a piezoelectric element may also be used.

Next, a description will be given of a circulation flow path 5 of the present embodiment which supplies ink from the supply flow path 7 to the pressure chamber 3 and discharges the ink to the common flow path 7. As shown in FIG. 2C, each of the second substrate 16, the second flow path member 15, the first substrate 14, the first flow path member 13, and the orifice plate 12 forms a wall, whereby the circulation flow path 5 is formed for each printing element. In the circulation flow path 5, ink flows and circulates as shown by an arrow in FIG. 2C. The circulation flow path 5 is constituted of a liquid delivery flow path 10 formed by the second flow path member 15 between the first substrate 14 and the second substrate 16, a penetrating flow path 6 formed by the first substrate 14 and connecting the liquid delivery flow path 10 to the pressure chamber 3, the pressure chamber 3, and a discharge flow path 17 connected to the pressure chamber 3.

As a mechanism for generating an ink flow in the circulation flow path 5, a liquid delivery mechanism 9 is provided in the liquid delivery flow path 10. The liquid delivery mechanism 9 is provided on the surface of the second substrate 16 at a position facing the back side of the surface of the first substrate 14 on which the energy generating element 1 is provided. Since the ejection opening 2, the energy generating element 1, and the liquid delivery mechanism 9 are thus aligned in the Z direction in the present embodiment, the arrangement of the liquid delivery mechanism 9 does not affect the arrangement of the ejection opening 2 and no restriction is imposed on a resolution, with the result that the ejection openings 2 can be arranged to realize a high resolution. Further, since the arrangement of the liquid delivery mechanism 9 does not affect the arrangement of the ejection opening 2, the size of the liquid delivery mechanism 9 and the width of the liquid delivery flow path 10 can be set at a high degree of freedom depending on an ejection opening diameter and the circulation efficiency corresponding to the ejection opening diameter can be realized.

The alignment of the energy generating element 1 and the liquid delivery mechanism 9 described here will be expressed below as follows: the liquid delivery mechanism 9 is arranged below the energy generating element 1 and the energy generating element 1 is arranged above the liquid delivery mechanism 9. In line with this, positional relationships among other members in the Z direction will be also described with the expressions "above" and "below."

An electrothermal transducing element is used for the liquid delivery mechanism 9 in the present embodiment. Incidentally, the liquid delivery mechanism 9 is not limited to the electrothermal transducing element and may be a piezoelectric element. In this case, the circulation direction may be opposite to that of the present embodiment but the element can be applied similarly by taking a flow resistance in the circulation flow path into consideration.

While ink is not ejected, allow direction in the circulation flow path 5 is as shown by the arrow in FIG. 2C and the ink supplied from the penetrating flow path 6 to the pressure chamber 3 flows into the common flow path 7 through the discharge path 17. The common flow path 7 communicates with the liquid delivery flow path 10 and the discharge flow path 17 and extends in the Y direction along the ejection opening array.

Figure 3:
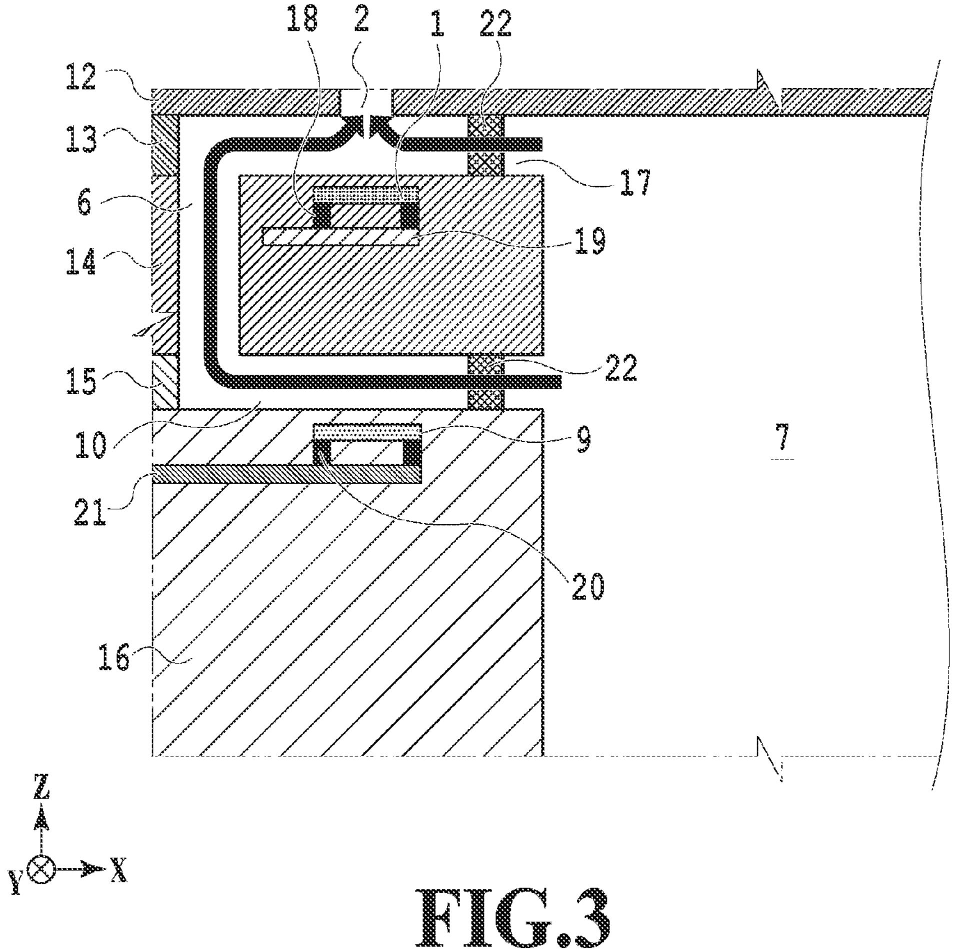
FIG. 3 is a diagram showing flow directions in a circulation flow path in the case of ink resupply to a pressure chamber.

FIG. 3 is a diagram showing flow directions in the circulation flow path 5 in the case of ink resupply to the pressure chamber 3. As shown in FIG. 3, in the circulation flow path 5 in the case of ink resupply to the pressure chamber 3 after ink ejection from the ejection opening 2, there are a flow of ink supplied from the penetrating flow path 6 and a flow of ink supplied from the discharge flow path 17 with the ejection opening 2 therebetween. Accordingly, the flow through the discharge flow path 17 is opposite to the flow at the time of circulation without ejection and ink is supplied from the common flow path 7 to the discharge flow path 17.

In a case where the ink in the pressure chamber 3 is consumed by ejection operation, the ejection opening 2 is supplied with new non-concentrated fresh ink. Even in a case where ejection operation is not performed, ink circulates through the circulation flow path and the ejection opening 2 is supplied with fresh ink. At this time, in order to avoid entry of foreign matter, bubbles, and the like into the flow path and ejection opening 2, it is preferable to provide a filter 22 (see FIG. 2A and FIG. 2B) capable of catching foreign matter and bubbles. By arranging the filter 22 not only at the inlet of the liquid delivery flow path 10 through which ink flows into the circulation flow path 5 but also at the discharge flow path 17 side, the entry of foreign matter can be prevented in a case where ink is also supplied from the discharge flow path 17 in ejection operation.

As shown in FIG. 2A, the energy generating element 1 generates heat based on a pulse signal input via first electric wiring 8 provided in the first substrate 14. The heat generation by the energy generating element 1 produces film boiling in ink and the growth energy of the generated bubbles is used to eject ink from the ejection opening 2. As shown in FIG. 2C, in the present embodiment, a first electric wiring layer 19 is arranged below the energy generating element 1 and the energy generating element 1 and the first electric wiring layer 19 are connected via a first plug 18 that is an electric connecting member. However, the connection is not limited to this and may be made via a plug formed by a plurality of wiring layers.

The first electric wiring 8 including the first electric wiring layer 19 is wiring for electrically connecting the energy generating element 1 to an external connection terminal (not shown) connectable to an external device and is formed of a conductive material. In the present embodiment, a plurality of penetrating flow paths 6 are provided to correspond to the respective pressure chambers 3. Accordingly, the electric wiring 8 for connecting the first electric wiring layer 19 to the external connection terminal is routed between adjacent penetrating flow paths 6. By thus routing the electric wiring 8 between adjacent penetrating flow paths 6, the wiring can be provided without making an excessive detour. As a result, the wiring resistance can be suppressed from increasing.

Further, a second electric wiring layer 21 is provided below the liquid delivery mechanism 9 and the liquid delivery mechanism 9 and the second electric wiring layer 21 are connected via a second plug 20 that is an electric connecting member. However, the connection is not limited to this and may be made via a plug formed by a plurality of wiring layers. Second electric wiring 11 including the second electric wiring layer 21 is wiring for electrically connecting the liquid delivery mechanism 9 to an external connection terminal (not shown) and is formed of a conductive material.

The first substrate 14 and the second substrate 16 may be provided with driving circuits, respectively, such that the energy generating elements 1 and the liquid delivery mechanisms 9 are electrically connected within the respective substrates. Alternatively, an electric connection via (not shown) may be provided between the first substrate 14 and the second substrate 16 such that the energy generating elements 1 and the liquid delivery mechanisms 9 are electrically connected between the substrates.

Incidentally, although the energy generating element 1 and the liquid delivery mechanism 9 are aligned in the vertical direction in the present embodiment, the positional relationship is not limited to this as long as the energy generating element 1 and the liquid delivery mechanism 9 are provided one above the other without being provided in the same layer or interfering with each other.

As described above, the liquid delivery mechanism 9 is arranged below the energy generating element 1, the penetrating flow paths 6 are provided to correspond to the respective pressure chambers 3, and the electric wiring 8 is routed between adjacent penetrating flow paths 6. This makes it possible to provide a liquid ejection module capable of arranging ejection openings for a high resolution and suppressing an increase in wiring resistance without decreasing liquid circulation efficiency.

Second Embodiment

The second embodiment of the present invention will be described below with reference to the drawings. Since a basic configuration of the present embodiment is the same as that of the first embodiment, a characteristic configuration will be described below.

Figure 4A:
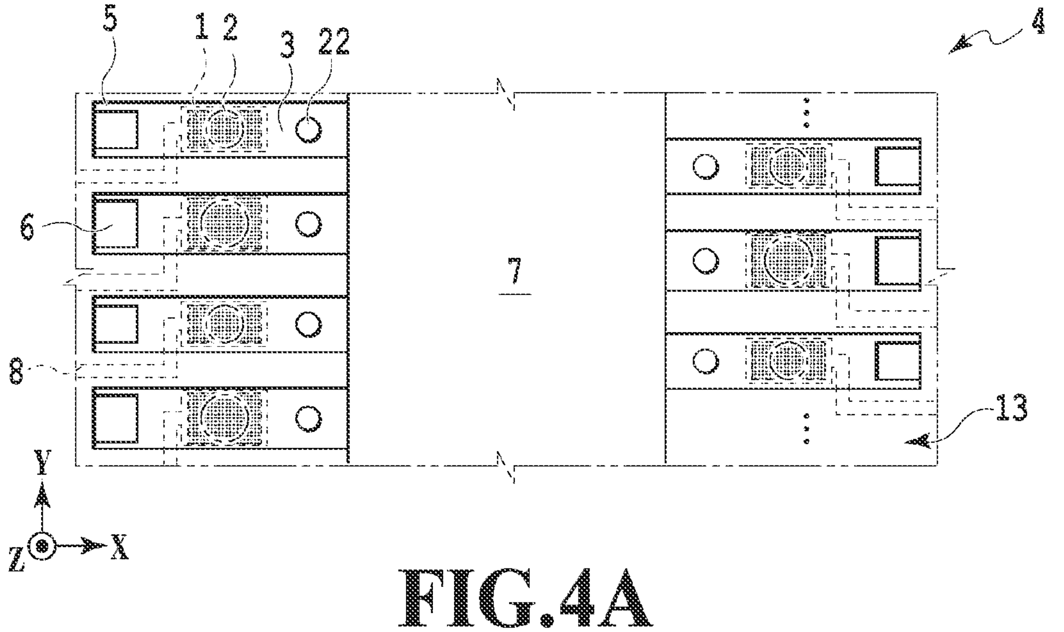
FIG. 4A is an enlarged view of part of the printing element substrate.
Figure 4B:
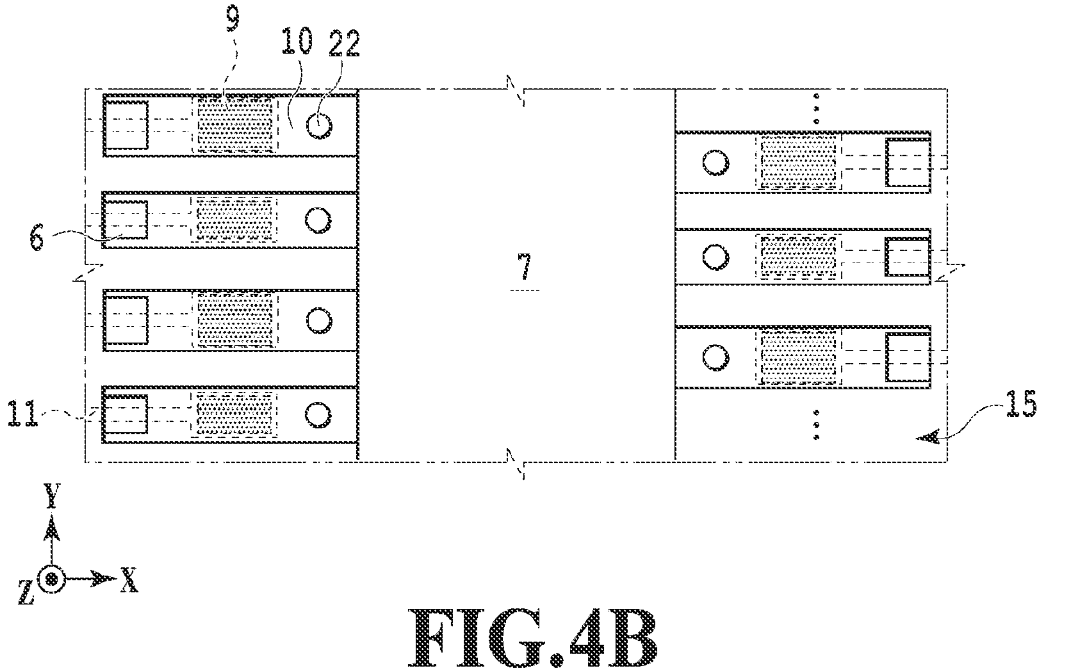
FIG. 4B is an enlarged view of part of the printing element substrate.

FIG. 4A and FIG. 4B are enlarged views of part of the printing element substrate 4 in the present embodiment and show a flow path configuration and wiring close to the ejection openings in the present embodiment. FIG. 4A and FIG. 4B are plan views of the printing element substrate 4 seen from the side facing the ejection openings 2 (+Z direction). Incidentally, FIG. 4A shows a configuration from the orifice plate 12 to the first substrate 14 and FIG. 4B shows a configuration from the first substrate 14 to the second substrate 16.

In the present embodiment, the ejection openings 2 in the ejection opening array have different ejection opening diameters. In line with the ejection opening diameters, the energy generating elements 1, the pressure chambers 3, and the penetrating flow paths 6 also have different flow path widths. In the present embodiment, an ejection opening with a large ejection opening diameter and an ejection opening with a small ejection opening diameter are alternately arranged in the ejection opening array. A pressure chamber width corresponding to the ejection opening with the large ejection opening diameter is wider than a pressure chamber width corresponding to the ejection opening with the small ejection opening diameter. Similarly, as to pressure generating elements, the size of an energy generating element 1 corresponding to the ejection opening with the large ejection opening diameter is larger than the size of an energy generating element 1 corresponding to the ejection opening with the small ejection opening diameter.

In a case where the ejection opening diameter is small and the pressure chamber width is narrow, the amount of flowing ink is less than that in a case where the ejection opening diameter is large and the pressure chamber width is wide, Ink evaporates from the ejection openings 2 and the ink evaporation largely depends on a flow rate. An evaporation rate from the ejection opening 2 in the case of the narrow pressure chamber width with a low ink flow rate is higher than that in the case of the wide pressure chamber width with a high flow rate.

Accordingly, in the present embodiment, as shown in FIG. 4B, a liquid delivery mechanism 9 corresponding to the small ejection opening diameter is made larger than a liquid delivery mechanism 9 corresponding to the large ejection opening diameter, and the width of a liquid delivery flow path 10 corresponding to the small ejection opening diameter is made wider than the width of a liquid delivery flow path 10 corresponding to the large ejection opening diameter. By thus increasing a flow velocity in the flow path corresponding to the small ejection opening diameter and enhancing the circulation efficiency, ink can be suppressed from thickening in the flow path corresponding to the small ejection opening diameter.

As described above, ejection openings may have various ejection opening diameters.

Third Embodiment

The third embodiment of the present invention will be described below with reference to the drawings. Since a basic configuration of the present embodiment is the same as that of the first embodiment, a characteristic configuration will be described below.

Figure 5A:
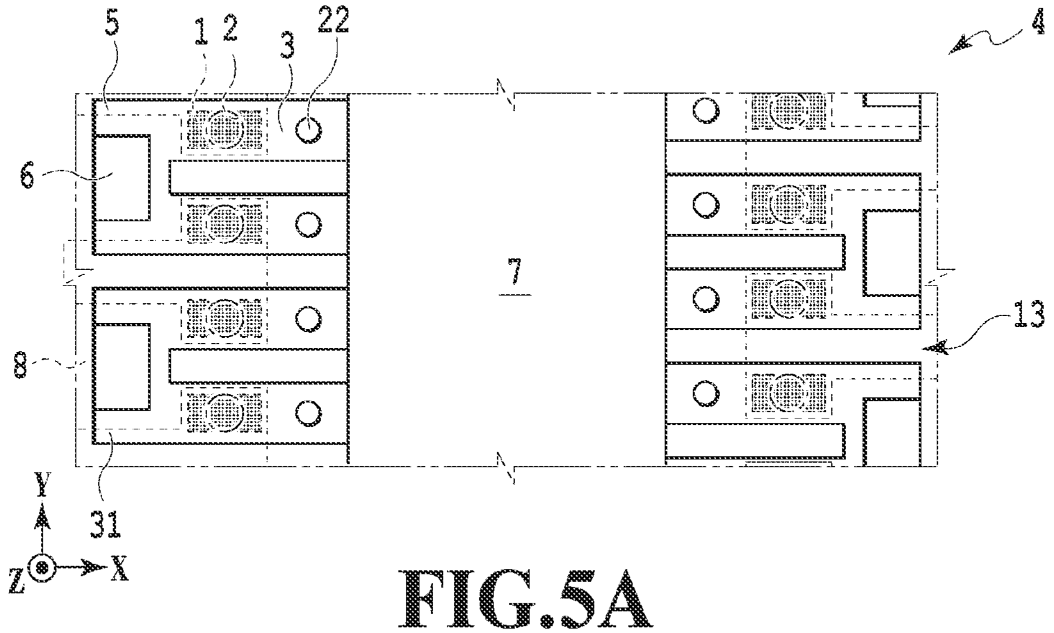
FIG. 5A is an enlarged view of part of the printing element substrate.
Figure 5B:
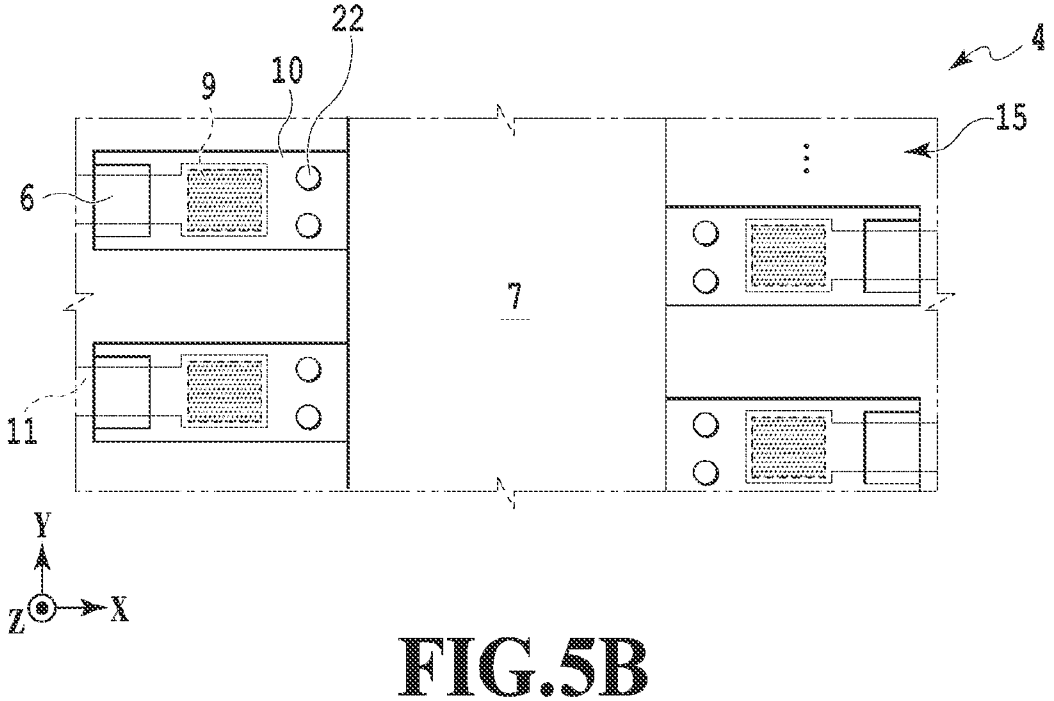
FIG. 5B is an enlarged view of part of the printing element substrate.

FIG. 5A and FIG. 5B are enlarged views of part of the printing element substrate 4 in the present embodiment and show a flow path configuration and wiring close to the ejection openings in the present embodiment. FIG. 5A and FIG. 5B are plan views of the printing element substrate 4 seen from the side facing the ejection openings 2 (+Z direction). Incidentally, FIG. 5A shows a configuration from the orifice plate 12 to the first substrate 14 and FIG. 5B shows a configuration from the first substrate 14 to the second substrate 16.

In the present embodiment, a common flow path 31 connected to multiple (two in the present embodiment) pressure chambers 3 is formed in the first flow path member 13. The common flow path 31 is connected to the penetrating flow path 6 and supplies ink from the liquid delivery flow path 10 to each pressure chamber 3 through the penetrating flow path 6. As shown in FIG. 5B, a circulation flow path 5 having one liquid delivery mechanism 9 and one liquid delivery flow path 10 is formed for each penetrating flow path 6. Accordingly, multiple (two in the present embodiment) energy generating elements 1 are provided fig each liquid delivery mechanism 9.

The first electric wiring 8 may be formed for each energy generating element 1 as shown in FIG. 2A or may be formed between adjacent penetrating flow paths 6 to connect multiple energy generating elements 1 together as shown in FIG. 5A. Incidentally, it is more preferable to connect multiple energy generating elements 1 together as shown in FIG. 5A because the resistance of the electric wiring can be reduced.

Fourth Embodiment

The fourth embodiment of the present invention will be described below with reference to the drawings. Since a basic configuration of the present embodiment is the same as that of the first embodiment, a characteristic configuration will be described bel ow.

Figure 6A:
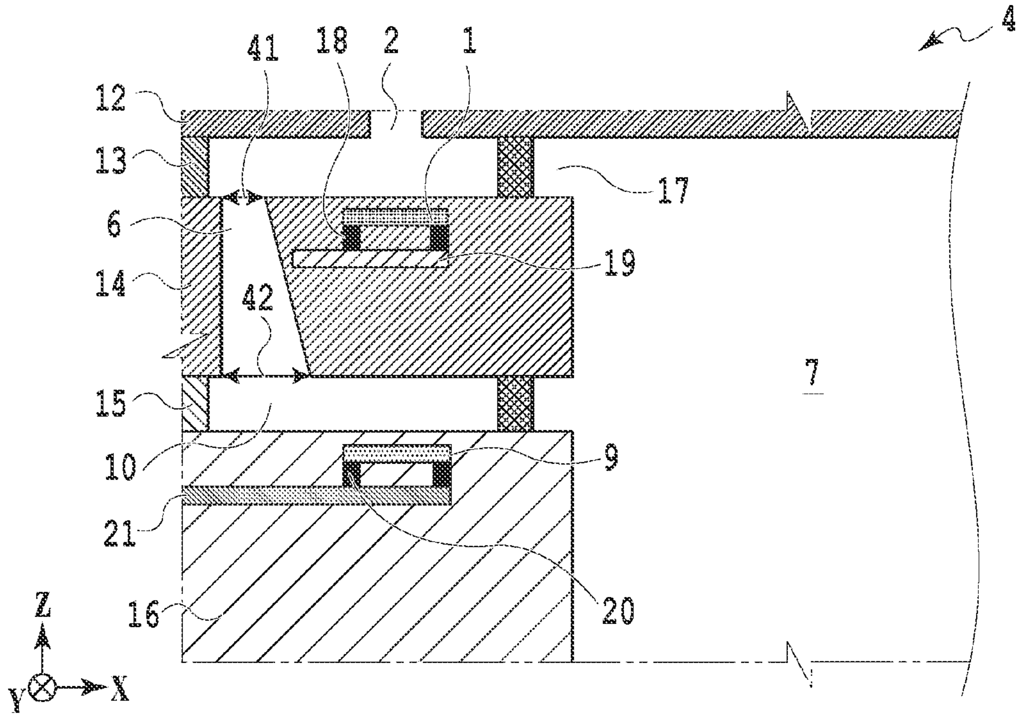
FIG. 6A is a cross-sectional view showing a flow path structure of the printing element substrate.

FIG. 6A is a cross-sectional view showing a flow path structure of the printing element substrate 4 in the present embodiment. The first substrate 14 in the printing element substrate 4 of the present embodiment is formed of a substrate thicker than the first substrate of the first embodiment and configured such that the outlet of the discharge flow path 17 is away from the inlet of the liquid delivery flow path 10 in a height direction. This can suppress concentrated ink discharged from the outlet of the discharge flow path 17 from flowing again into the inlet of the liquid delivery flow path 10 and suppress ink concentration in the circulation flow path.

Further, in the present embodiment, in the penetrating flow path 6, a first opening 41 which is a connecting portion to the pressure chamber 3 and a second opening 42 which is a connecting portion to the liquid delivery flow path 10 are different in opening width. The opening width of the second opening 42 is wider than that of the first opening 41. In the present embodiment, since the thickness of the first substrate 14 is increased, the length of the penetrating, flow path 6 becomes long and the flow resistance in the penetrating flow path 6 is increased. Thus, the increase in flow resistance in the penetrating flow path 6 can be suppressed by making the opening width of the second opening 42 wider than that of the first opening 41.

Modified Example

Figure 6B:
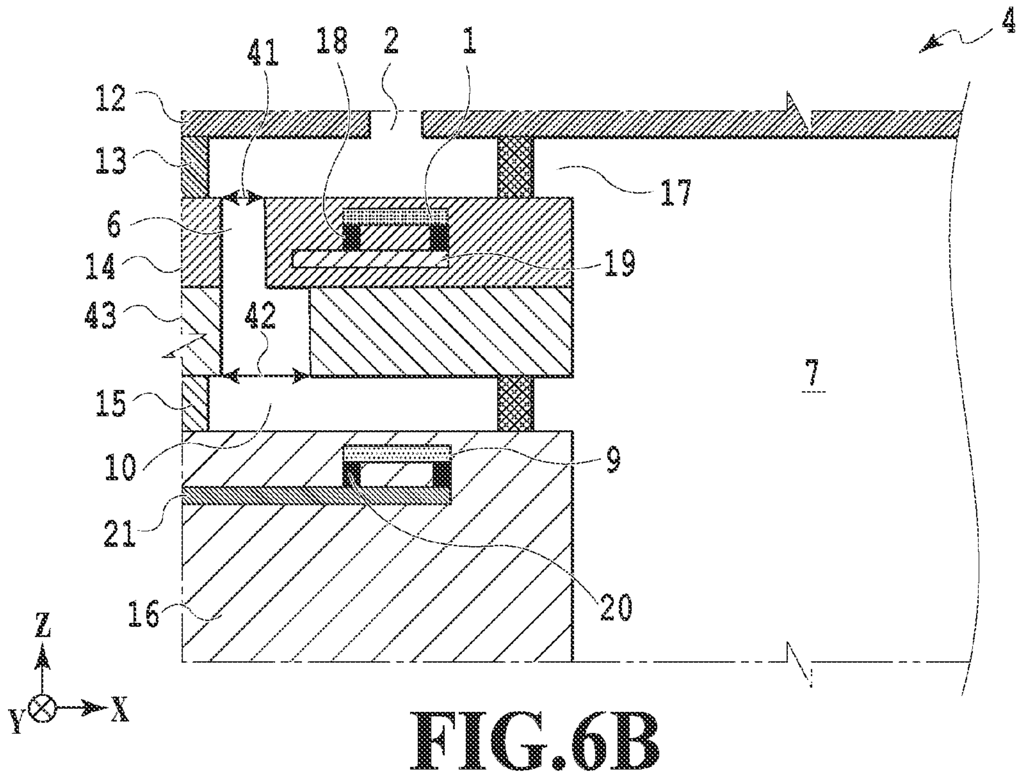
FIG. 6B is a cross-sectional view showing the flow path structure of the printing element substrate.

FIG. 6B is a diagram showing a modified example of the present embodiment and is a cross-sectional view showing a flow path structure of the printing element substrate 4 of the modified example. In the present embodiment, the penetrating flow path 6 is formed by the first substrate 14 and a third substrate 43. The sum of the thickness of the first substrate 14 and the thickness of the third substrate 43 is larger than the thickness of the first substrate of the first embodiment. The opening width of the second opening 42 of the penetrating flow path 6 in the third substrate 43 is wider than the opening width of the first opening 41 of the penetrating flow path 6 in the first substrate 14. This configuration may also be used to suppress the increase in flow resistance in the penetrating flow path 6.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-068389 filed Apr. 18, 2022, which is hereby incorporated by reference herein in its entirety.

What is claimed is:

1. A liquid ejection module comprising:
- an ejection opening provided in a part of a pressure chamber;
- an energy generating element provided in a first substrate forming a part of the pressure chamber at a position facing the ejection opening and configured to provide liquid in the pressure chamber with energy for ejection;
- a penetrating flow path which is a flow path penetrating the first substrate and is connected to the pressure chamber by a first opening;
- a liquid delivery flow path connected to a second opening different from the first opening of the penetrating flow path;
- a liquid delivery mechanism provided in the liquid delivery flow path and configured to provide liquid with energy for supplying liquid from the liquid delivery flow path to the pressure chamber through the penetrating flow path; and
- first electric wiring electrically connected to the energy generating element,
- wherein a plurality of pressure chambers and a plurality of energy generating elements are provided,
- the liquid delivery mechanism is provided in a second substrate stacked with the first substrate,
- a plurality of penetrating flow paths are provided to correspond to the respective pressure chambers,
- the first electric wiring is routed between adjacent penetrating flow paths,
- each pressure chamber is connected to a corresponding discharge flow path for discharging liquid supplied from the corresponding penetrating flow path to a common flow path, and
- the liquid delivery flow path and the discharge flow paths comprise filters capable of catching foreign matter and bubbles included in liquid.

2. The liquid ejection module according to claim 1, wherein
- the ejection opening is formed in an orifice plate stacked on the first substrate and provided in each of the pressure chambers, and
- an ejection opening array is formed by arraying the plural ejection openings.

3. The liquid ejection module according to claim 1, wherein
- the common flow path is connected to the liquid delivery flow path, and
- liquid supplied from the common flow path to the liquid delivery flow path is supplied to the discharge flow path through the penetrating flow path and the pressure chamber.

4. A liquid ejection module comprising:
- an ejection opening provided in a part of a pressure chamber;
- an energy generating element provided in a first substrate forming a part of the pressure chamber at a position facing the ejection opening and configured to provide liquid in the pressure chamber with energy for ejection;

a penetrating flow path which is a flow path penetrating the first substrate and is connected to the pressure chamber by a first opening;

a liquid delivery flow path connected to a second opening different from the first opening of the penetrating flow path;

a liquid delivery mechanism provided in the liquid delivery flow path and configured to provide liquid with energy for supplying liquid from the liquid delivery flow path to the pressure chamber through the penetrating flow path; and first electric wiring electrically connected to the energy generating element, wherein a plurality of pressure chambers and a plurality of energy generating elements are provided, the liquid delivery mechanism is provided in a second substrate stacked with the first substrate, a plurality of penetrating flow paths are provided to correspond to the respective pressure chambers, the first electric wiring is routed between adjacent penetrating flow paths, the ejection opening is provided in plural and formed in an orifice plate stacked on the first substrate and provided in each of the pressure chambers, an ejection opening array is formed by arraying the plural ejection openings, and the plural ejection openings are formed different in diameter.

5. The liquid ejection module according to claim 4, wherein the plural ejection openings include a first ejection opening and a second ejection opening larger in diameter than the first ejection opening, and wherein the first ejection opening and the second ejection opening are each provided in plural and are alternately arranged in the ejection opening array.

6. The liquid ejection module according to claim 5, wherein a width of a first pressure chamber corresponding to the first ejection opening is narrower than a width of a second pressure chamber corresponding to the second ejection opening.

7. The liquid ejection module according to claim 6, wherein a first liquid delivery mechanism providing energy to liquid supplied to the first pressure chamber is larger in size than a second liquid delivery mechanism providing energy to liquid supplied to the second pressure chamber.

8. The liquid ejection module according to claim 6, wherein a width of a first liquid delivery flow path supplying liquid to the first pressure chamber is wider than a width of a second liquid delivery flow path supplying liquid to the second pressure chamber.

9. The liquid ejection module according to claim 1, wherein the liquid delivery flow path supplies liquid to the pressure chambers.

10. The liquid ejection module according to claim 9, wherein the energy generating elements are connected to a common first electric wiring.

11. A liquid ejection module comprising:

an ejection opening provided in a part of a pressure chamber;

an energy generating element provided in a first substrate forming a part of the pressure chamber at a position facing the ejection opening and configured to provide liquid in the pressure chamber with energy for ejection;

a penetrating flow path which is a flow path penetrating the first substrate and is connected to the pressure chamber by a first opening;

a liquid delivery flow path connected to a second opening different from the first opening of the penetrating flow path;

a liquid delivery mechanism provided in the liquid delivery flow path and configured to provide liquid with energy for supplying liquid from the liquid delivery flow path to the pressure chamber through the penetrating flow path; and first electric wiring electrically connected to the energy generating element, wherein a plurality of pressure chambers and a plurality of energy generating elements are provided, the liquid delivery mechanism is provided in a second substrate stacked with the first substrate, a plurality of penetrating flow paths are provided to correspond to the respective pressure chambers, the first electric wiring is routed between adjacent penetrating flow paths, and a width of the first opening is narrower than a width of the second opening.

12. The liquid ejection module according to claim 11, wherein each penetrating flow path is formed by the first substrate and a third substrate.

13. The liquid ejection module according to claim 1, further comprising second electric wiring connected to the liquid delivery mechanism, wherein the liquid delivery mechanism is an electrothermal transducing element.

14. The liquid ejection module according to claim 13, further comprising an electric connection between the first substrate and the second substrate, wherein each energy generating element and the liquid delivery mechanism are electrically connected between the substrates.

15. The liquid ejection module according to claim 1, wherein each energy generating element and the first electric wiring are connected via a plug formed by a plurality of wiring layers.

16. The liquid ejection module according to claim 13, wherein the liquid delivery mechanism and the second electric wiring are connected via a plug formed by a plurality of wiring layers.

17. The liquid ejection module according to claim 13, wherein the first electric wiring and the second electric wiring are electrically connected to an external connection terminal connectable to an external device.

18. The liquid ejection module according to claim 1, wherein each energy generating element is an electrothermal transducing element.

* * * * *